May 3, 1955 E. W. MADGE ET AL 2,707,305
PRODUCTION OF MICROPOROUS RUBBER SHEETING
Filed Oct. 30, 1951 2 Sheets-Sheet 1
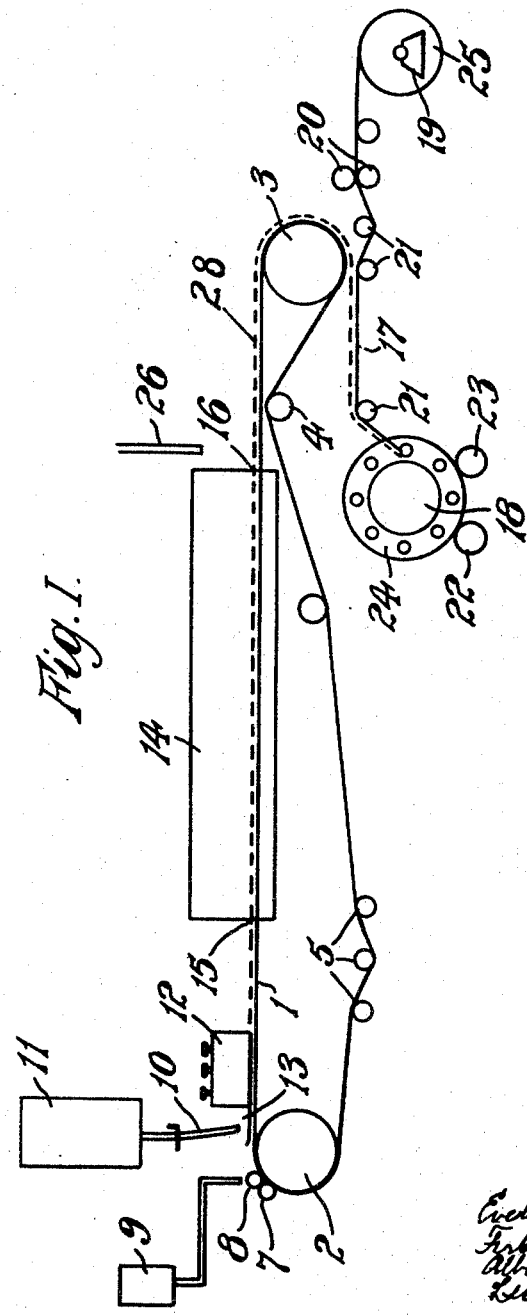

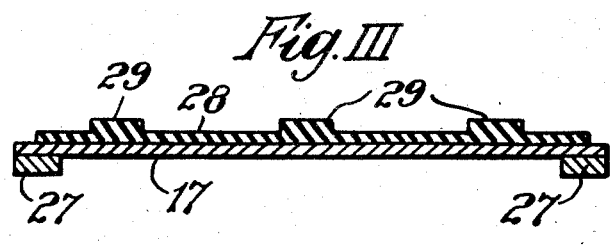
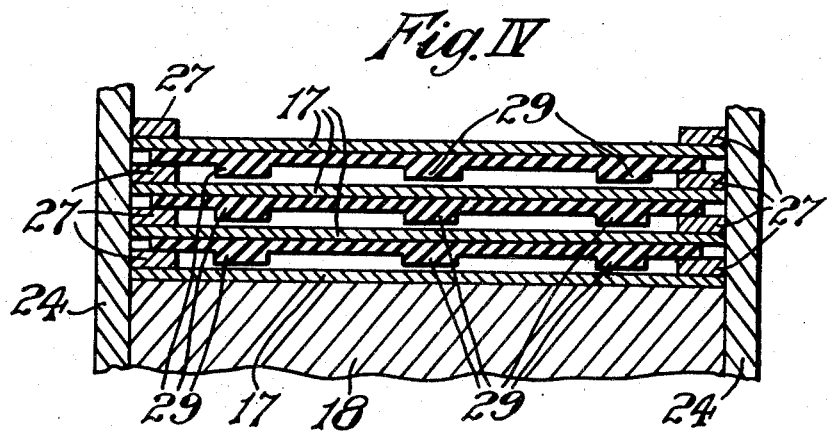

United States Patent Office 2,707,305
Patented May 3, 1955

2,707,305

PRODUCTION OF MICROPOROUS RUBBER SHEETING

Evelyn William Madge, Sutton Coldfield, Frank Theodore Purkis, Bournville, Albert Nelson Ward, Castle Bromwich, and Leslie Norman Wesley, Erdington, England, assignors to Dunlop Rubber Company Limited, London County, England, a British company Application October 30, 1951, Serial No. 253,814

11 Claims. (Cl. 18—6)

This invention relates to the production of microporous rubber sheeting.

In co-pending application of Ward, Madge and Purkis, Ser. No. 201,942, filed December 31, 1950, there is described an improved process for the production of microporous rubber sheeting which comprises spreading on a smooth imperforate support moistened with an aqueous coagulant for rubber an unfoamed rubber latex composition containing gelling and vulcanising agents, gelling the resultant sheet under conditions preventing escape of water from the sheet, transferring the gelled unvulcanised sheet to a porous support, and vulcanising the sheet under conditions preventing escape of water from the sheet. If it is desired to use this process for the production of battery separators the microporous rubber sheeting is heated to a temperature at which it is plastic, and is then corrugated and cut to the required size. In this method the production of the battery separators involves a step separate from that of the production of the sheets and the separators have no solid ribs.

Our invention provides microporous rubber sheeting having solid ribs instead of corrugations and means for vulcanising a gelled unvulcanised rubber sheeting having ribs without damaging the ribs and preferably to avoid shrinkage of the latter during vulcanization. Our invention also provides a suitable apparatus for the production of such sheeting.

According to our invention a process for the production of microporous rubber sheeting having solid ribs comprises casting a heat-vulcanisable unfoamed rubber latex composition containing a gelling agent into the form of a sheet with solid ribs, gelling the composition in the cast sheet form under conditions preventing escape of water therefrom, supporting the gelled sheet under conditions preventing deformation of the ribs thereof and permitting access of a fluid heating medium to the surfaces thereof, and vulcanising the gelled sheet while so supported by contact with a fluid heating medium under conditions preventing escape of water therefrom. Preferably the production of the microporous vulcanised rubber sheeting is carried out in a continuous manner by spreading the rubber latex composition on a smooth imperforate grooved sheet support moistened with an aqueous coagulant for rubber latex, gelling the rubber latex composition on the said sheet support, transferring the resultant sheet to a porous support, and vulcanising the sheet on the porous support by contact with a fluid heating medium under conditions preventing evaporation of water from the sheet.

The invention also comprises an apparatus for making ribbed rubber sheeting comprising an endless imperforate belt supported horizontally between supporting rollers and having a smooth grooved upper surface, a rubber coagulant applicator and a spreader for spreading rubber latex composition thereon to a predetermined width, means for moving said belt to forward the upper reach thereof in turn past the said applicator and the said spreader and thence through a gelling station, a porous band support for the gelled sheet having lateral ridges of height greater thtan the depth of the grooves and spaced apart by an amount suffiicent to accommodate the ribbed portion of the gelled sheet therebetween, and means for forwarding the said band support beneath the supporting roller on the downsteram side of the gelling chamber, whereby the gelled sheet carried over the latter supporting roller can be delivered on to the porous band support. Preferably the apparatus comprises also means for coiling the porous band support with the gelled sheet thereon so that the ribbed portion of the gelled sheet lies in the cavity formed by the ridges of the band support between succeeding convolutions thereof. Preferably the lateral ridges are spaced apart by a distance less than the width of the sheet, whereby when the porous band support is coiled with the gelled sheet thereon the edge of the sheet are gripped between the ridges of one convolution of the coiled support and an adjacent convolution of the support.

The grooved smooth imperforate support may be an endless smooth imperforate belt with endless grooves running parallel to its edges; alternatively the grooves may be disposed transversely of the length of the belt but extend centrally over the major portion only of the width of the belt, leaving edge portions ungrooved. Suitably the belt is made of rubber-covered fabric, the grooves being moulded into the rubber covering layer during vulcanisation in the production of the belt. The rubber latex composition is then spread on the belt to a width sufficient to fill the grooves and to leave a narrow unribbed portion at each edge of the sheet so spread. The composition may be spread for example by means of a doctor blade device so that a layer of suitable thickness less than the height of the ridges of the porous band support is formed on the belt.

The porous support is preferably a fabric belt on to the edges of which have been fastened two fabric tapes or webs to form a ridge at each edge of the belt, the thickness of the tapes or webs, and thus the height of the ridges, being slightly greater than the height of the ribbed portion of the gelled rubber sheet to be produced. It is also preferred to preshrink the fabric belt and tapes or webs under vulcanising conditions before they are fastened together to form the porous support to prevent cockling of the belt in use. The widths of the belt and of the webs or tapes are preferably such that when coiled up the portions of the gelled ribbed rubber sheet between each edge and the nearest rib of the sheet are nipped between the ridges at the edges of one layer of the fabric belt and the adjacent flat surface of the next layer of fabric belt.

Alternatively the edges of a porous fabric belt can be turned over and sewn down so that ridges are formed on the edges of the belt and that layers of the belt, when coiled up, are spaced apart from each other leaving a cavity between successive layers for reception of the gelled ribbed sheet.

In a further form of the invention a flat fabric belt is used and detached tapes of suitable width and thickness are fed through guides to the coiling device and are wound up with the gelled sheet so that they space the ribs of the gelled sheet from the adjacent turn of the belt and also grip the edges of the sheet.

In each of the above described forms of the invention the gelled sheet is stored in coiled form ready for vulcanisation with the ribbed surface protected from contact with the adjacent turn of the coiled porous support by the tapes or webs which act as spacers. These tapes or webs also cause the unribbed edges of the gelled sheet to be gripped by pressure against its supporting surface so that shrinkage in width cannot occur during vulcanisation.

By using a fabric belt as a support for the gelled ribbed sheet and by also having the spacing members of the belt made of fabric, the fluid vulcanising medium, viz. steam or hot water, has free access to the gelled ribbed sheet during its vulcanisation.

The rubber latex compositions used in making the ribbed sheet are preferably compounded in known manner with sulphur, gelling agents, and if desired antioxidants. Accelerators may also be present though if ebonite mixings are employed these may be omitted, vulcanisation then being carried out at temperatures above 100° C. and at elevated pressure such that vaporisation of water is prevented e. g. by immersion in hot water in an autoclave. The invention is particularly useful for making ribbed microporous hard rubber battery separators for which an ebonite mixing is suitable.

The aqueous coagulant employed to wet the surface of the imperforate belt may be a salt of a polyvalent metal and a weak organic carboxylic acid, for example calcium formate. It is preferred that a comparatively dilute solution of the coagulant is employed so that heating, e. g. in a steam chamber, is necessary to effect coagulation of the rubber latex sheets, though the concentration should be high enough for coagulation to be effected under such conditions in a technically feasible time.

The invention will be further described with reference to the accompanying drawings in which:

Fig. I is a general diagrammatic representation of an apparatus for carrying out the present invention.

Fig. II is a cross section of the belt and gelled sheet thereon at AA of Fig. I.

Fig. III is a cross section of the canvas supporting belt with the gelled sheet thereon.

Fig. IV is a fragmentary cross section through part of the coil on the stock reel.

In these drawings the apparatus comprises an endless grooved belt 1 of rubber-covered fabric, the belt being supported between two driving rollers 2 and 3 and freely rotating additional supporting rollers (not shown) so that the upper flight of the belt passes horizontally from the roller 2 over the additional supporting rollers and then to roller 3.

The endless belt is kept in contact with the second driving roller for approximately three quarters of its circumference by means of an additional belt-positioning roller 4 and the endless belt is suitably tensioned by suitable tensioning rollers 5. The belt 1 has a plurality of grooves 6 (Fig. II) extending lengthwise of the belt. On the up-stream side of the upper flight of the endless belt against the roller 2 are a licking roller 7 and a felt-covered wiping roller 8 for applying to the belt an aqueous solution of a coagulant for rubber from a container 9 for the coagulant solution. On the downstream side of the wiping roller there is situated a conduit 10 leading from a jacketed latex mixing tank 11 and spreading unit 12 which comprises a trough 13 having an outlet in the wall remote from the felt roller 8 and a series of adjustable doctor blades (not shown in the drawing) on the downstream side of the outlet disposed above the belt 1 and mutually spaced apart. Preferably the spreading unit comprises a delivery trough and a doctor blade arrangement of the type described in copending application Ser. No. 201,942, supra. Between the spreading unit and the roller 3 there is located a gelling chamber 14 having narrow slots at 15 and 16 just wide enough to admit the endless belt with the rubber latex sheet thereon. Means (not shown) are provided for delivering saturated steam to the chamber 14 and withdrawing condensate therefrom.

On the down-stream side of the steam chamber and separate from but adjacent to the endless belt, means are provided for delivering the gelled sheet on the endless belt issuing from the steam chamber on to a band support of preshrunk porous fabric 17 and for winding up the fabric with the gelled sheet thereon on to a stock reel 18. The band support 17 has preshrunk fabric tapes 27 sewn on to the edges forming lateral ridges (see Fig. II) and the spacing of the ridges is such that the ribbed portion of the gelled sheet can be accommodated between them but the distance between them is less than the total width of the gelled sheet. A support 19 for a spool of fabric band support 25, and nip rollers 20 for drawing off the band from the spool are provided, also a plurality of rollers 21 adapted to support the unrolled band and gelled sheet in a plane parallel to and slightly below the roller 3, two of the rollers 21 being adjacent the driving roller 3 of the endless belt, the third adjacent the stock reel 18. Winding gear for the stock reel is provided comprising two driving rollers 22 and 23, on both of which the flanges 24 of the stock reel rest; the roller 22 can be rotated by means not shown at a suitable speed and the stock reel is rotated in its turn by friction between its flanges and the roller 22. The band as it is unwound from the spool 25 by the nip rollers 20 passes, tapes 27 downwards, over the rollers 21 adjacent to the endless belt 1, and passes thence over the remaining rollers 21 to the stock reel 18, to be wound thereon with the ridges away from the axis of the spool 25. The nip rollers 20 for unwinding the spool 25 of the band support are separately driven at a speed such that the band travels at a very slightly greater linear speed than the endless belt 1 and the roller 22 driving the spool 18 is driven at a still greater speed so that there is slip between the flanges 24 of the spool and the driving roller 22. It can thus be ensured that the fabric is wound up at the same linear speed as it is unwound by the nip rollers 20 from the spool 25, and since it is arranged that this linear speed is very slightly greater than that of belt 1 the rubber sheet is very slightly stretched and lies smoothly on the band support. Means 26 are provided for spraying cold water on the gelled sheet on leaving the steam chamber 14 before the fabric and gelled sheet are wound up.

The invention will now be described with reference to the production of mircoporous ebonite sheeting by means of the apparatus above described using a latex ebonite mixing. A suitable latex mixing is one containing for every 100 parts of rubber 30 to 40 parts of sulphur, and 2 to 3 parts of calcium formate as gelling agent, the total solids of the latex mixing being, for example, 30 to 45%. The grooved endless belt 1 is set in motion and a coagulant for rubber, e. g. a dilute aqueous solution of aluminium sulphate, is supplied to the licking roller 7 whereby the smooth surface of the belt is evenly moistened with the coagulant; the endless belt then passes beneath the spreading device 12 whereby latex ebonite composition from tank 11 is delivered through conduit 10 to trough 13 and is spread on to the moving endless belt as an even sheet which may be, for example, 0.03 to 0.05 inch in thickness. The composition fills the grooves 6 and extends sideways to a point between the outside grooves 6 and the edge of the belt 1. The endless belt 1 carrying the latex sheet passes into the steam chamber 14 which is maintained full of saturated steam, whereby gelling of the latex sheet is effected. The band support 17 on which the gelled sheet is to be wound is threaded through the nip rollers 20, over the horizontal supporting rollers 21, and attached to the stock reel 18, and the nip rollers and the roller 22 are then rotated at the relative speeds indicated above. As the end of the gelled sheet 28 thus formed having ribs 29 emerges from the steam chamber 14 it is manually transferred from the downstream end of the upper reach of the endless belt 3 and placed on the moving fabric band support 17 with ribs 29 upwards. Thereafter transference of the sheet from the belt to the fabric band support proceeds automatically. As the end of the gelled sheet reaches the stock reel 18 it is guided into the space formed by succeeding convolutions of the belt and the tapes 27. Tapes 27 are thicker than the total thickness of the gelled sheet at the ribbed portions and thus there is no pressure on the ribs which might cause deformation of them. The tapes 27 at the sides of each layer of fabric band support nip the edges of the gelled sheet on the next layer of the band support thus preventing lateral shrinkage of the gelled ribbed sheet during subsequent vulcanisation. Thereafter the transference of the gelled sheet to the fabric band support proceed automatically, the gelled sheet being gradually caused to move forward with the fabric band support and wound up with the latter on the stock reel 18. The position of roller 4 ensures that the endless belt 1 continues around the roller 3 for a short distance thus facilitating separation of the gelled sheet from the belt. During the passage from the steam chamber to the stock reel water is sprayed on to the gelled sheet from sprays 26 so that it is kept moist and evaporation of water from the gelled sheet is thus prevented. The endless belt 1, freed from the gelled sheet, passes back to the driving roller 2 and is moistened with coagulant again. In this way a continuous length of gelled sheet is made on the endless belt 1, transferred to fabric belt 17, and wound up on the spool 18. When the last of the fabric band support passes through the nip rollers 20 another fabric on a fresh spool 25 and another empty stock reel 18 are placed in position and the end of the new fabric band support in threaded between the nip rollers and attached to the stock reel; the operation of spreading and gelling latex may be allowed to continue during this change-over, the part of the gelled sheet extending beyond the end of the endless belt 3 when the spool 25 and stock reel 18 are changed being manually placed on the new length of fabric when this is in position.

The stock reel with the coiled fabric band support and gelled sheet thereon is then placed in an autoclave, covered with water, and vulcanized in known manner, e. g. by steam at 40–80 lbs. gauge pressure. After removal from the vulcanising apparatus the stock reel is unwound again and the length of thin ebonite sheet separated from the fabric belt, the two being separately wound up on storage drums and the ebonite sheet then being dried in warm air. No difficulty is experienced in separating the ebonite sheet from the fabric and the fabric does not require any cleaning operation before it can again be used to support a further length of gelled sheet.

Having described our invention what we claim is:

1. Apparatus for making ribbed microporous rubber sheeting comprising supporting rollers an endless imperforate belt supported horizontally between said supporting rollers having a smooth grooved outer surface, a rubber coagulant applicator, a spreader for spreading rubber latex composition thereon to a predetermined width, a gelling station, means for moving the belt to forward the upper reach thereof in turn past said applicator and said spreader and thence through said gelling station, a porous band position to receive end support the gelled sheet having spaced longitudinal ribs, means for coiling the porous band with the gelled sheet thereon so that the ribbed portion of the gelled sheet lies between longitudinal ribs of the band between succeeding convolutions thereof, the spacing of the ribs of the band being such that the edges of the gelled sheet are gripped between one convolution of the band and ribs of an adjacent convolution thereof, means for forwardlying the said porous band beneath the supporting roller on the downstream side of the gelling station whereby the gelled sheet can be delivered onto the said porous band support.

2. A process of continuously forming ribbed sheets of microporous vulcanized rubber which comprises spreading a vulcanizable gellable rubber latex composition on a moving grooved surface to a width beyond said grooves, gelling said latex composition to form a ribbed sheet, removing the ribbed gelled sheet of latex from said surface and coiling it into a coil with spaced coils having a free gaseous space between said coils while gripping and spacing it at its margins to space the upper surfaces of the ribs from the surface of the next adjacent coil and vulcanizing said coiled sheet without loss of water therefrom.

3. The process of claim 2 in which said coiled sheets are vulcanized in a heating medium saturated with water at the temperature at which the sheets are vulcanized.

4. The process of claim 2 in which said ribbed gelled sheet of latex is transferred to a porous supporting sheet prior to coiling and is coiled with said porous supporting sheet.

5. A process for the production of microporous rubber sheeting which comprises forming a heat-vulcanizable, gellable, unfoamed rubber latex into a sheet having spaced, solid, ribs, gelling the formed sheet while preventing escape of water therefrom, mounting said sheet on a porous backing, supporting said gelled strip and backing at its edges in spaced sections with a free space between said supporting edges, said spacing being sufficient to space the surfaces of the ribs from an adjacent section and its backing and vulcanizing said sheet without loss of water with a fluid heating medium in free contact with said sections.

6. A process for the production of microporous rubber sheeting which comprises forming a heat-vulcanizable, gellable, unfoamed rubber latex into a continuous sheet having spaced, solid, ribs, gelling the formed sheet while preventing escape of water therefrom, mounting said sheet on a sheet of porous backing, coiling said gelled sheet and backing into coils with the ribs and sheet between said ribs spaced out of contact with the sheet and ribs of adjacent coils and with free gaseous space between said coils, supporting said sheet at its edges between said coils and vulcanizing said coiled sheet with a fluid heating medium without loss of water from said gelled strip.

7. The process of claim 6 in which said ribs extend longitudinally of said sheet and of the direction of coiling.

8. The process of claim 6 in which said fluid medium is hot water.

9. The process of claim 6 in which said sheet is formed on a continuous travelling forming backing grooved to form said ribs and in which said sheet is transferred after gelling to a porous flexible backing.

10. The process of claim 9 in which the surface of said forming backing is moistened with an aqueous coagulant of rubber latex before forming said sheet of latex thereon.

11. Apparatus for making ribbed microporous rubber sheet which comprises horizontal supporting rollers, an endless, imperforate belt movably supported horizontally by said rollers having a smooth upper surface and having grooves in said upper surface spaced side by side, an applicator to apply a film of coagulant to the upper surface of said endless imperforate belt on said rollers, a latex feeder and spreader positioned to supply latex and spread it to a sheet on the coagulant film on said belt, a gelling station positioned to receive said imperforate belt after the spreading of said latex thereon, a coiling reel, a porous supporting band, means to pass said supporting band below the delivery end of said belt in position to receive gelled latex sheet therefrom and thence to said reel, and spacers on said belt spaced transversely thereof to receive gelled ribbed sheet between them and of thickness to space the coils of belt and ribbed latex sheet on said coiling reel with the ribs of one coil out of contact with the sheet and ribs of adjacent coils.

References Cited in the file of this patent

UNITED STATES PATENTS

| Number | Name | Date |
|---|---|---|
| 1,924,635 | Buffington | Aug. 29, 1933 |
| 2,066,596 | West | Jan. 5, 1937 |
| 2,072,597 | Keen | Mar. 2, 1937 |
| 2,096,338 | Randall | Oct. 19, 1937 |
| 2,120,281 | Hunt | June 14, 1938 |
| 2,161,308 | Murphy | June 6, 1939 |
| 2,232,109 | Gibbons | Feb. 18, 1941 |
| 2,441,235 | Blair | May 11, 1948 |